United States Patent
Agrawal et al.

(10) Patent No.: US 7,712,141 B1
(45) Date of Patent: *May 4, 2010

(54) DETERMINING ADVERTISING ACTIVITY

(75) Inventors: Shrish Agrawal, Sunnyvale, CA (US); Johnny Chen, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 1117 days.

This patent is subject to a terminal disclaimer.

(21) Appl. No.: 11/170,134

(22) Filed: Jun. 30, 2005

(51) Int. Cl.
*H04L 9/00* (2006.01)
*G06F 11/00* (2006.01)
*H04L 9/32* (2006.01)

(52) U.S. Cl. .............. 726/26; 726/27; 726/28; 726/29; 726/30; 713/168; 713/169; 713/170; 713/171; 713/172

(58) Field of Classification Search .......... 726/26
See application file for complete search history.

(56) References Cited

U.S. PATENT DOCUMENTS

| 5,948,061 | A | * | 9/1999 | Merriman et al. | ........... 709/219 |
|---|---|---|---|---|---|
| 7,020,622 | B1 | * | 3/2006 | Messer | ......................... 705/26 |
| 2001/0049745 | A1 | | 12/2001 | Schoeffler | |
| 2004/0093327 | A1 | | 5/2004 | Anderson et al. | .............. 707/3 |
| 2004/0117654 | A1 | | 6/2004 | Feldman et al. | |
| 2004/0153365 | A1 | | 8/2004 | Schneider et al. | |

OTHER PUBLICATIONS

Paul Graham; "Filters That Fight Back"; http://www.paulgraham.com/ffb.html; Aug. 2003; 3 pages.
Co-pending U.S. Appl. No. 10/878,653, filed Jun. 29, 2004, titled "Systems and Methods for Determining Advertising Activity", Johnny Chen et al., 42 pages.

* cited by examiner

*Primary Examiner*—Longbit Chai
(74) *Attorney, Agent, or Firm*—Harrity & Harrity, LLP (57) ABSTRACT

A system may obtain a first group of information when an advertising link is requested and a second group of information when the advertising link is selected. The system may further detect illegitimate advertising-related activity based on the first group of information and the second group of information.

35 Claims, 5 Drawing Sheets

DETERMINING ADVERTISING ACTIVITY

FIELD OF THE INVENTION

Implementations consistent with the principles of the invention relate generally to advertising and, more particularly, to the processing of advertising information.

BACKGROUND OF THE INVENTION

An on-line advertising system may provide advertising links (also referred to as "impressions" hereinafter) to users when they visit certain web pages. When a particular advertising link is of interest to a user, a user may select (or click) the advertising link, which may cause the user's web browser to visit a web page belonging to the advertiser associated with the advertising link. This selection of an advertising link by a user is commonly referred to as a "click."

On-line advertising systems often track impressions and clicks, and calculate charges based thereon. For example, an on-line advertising system may calculate a charge based, at least in part, on the clicks that an advertising link receives. Charges may also be calculated based on other characteristics as well, such as time of day, location of the user, age or other demographic information associated with the user, or the like.

On-line advertising systems may charge companies a predetermined fee for each click or impression associated with the companies' advertisements. The on-line advertising system may also pay a fee to the web publisher that displays an advertising link for each click that the advertising link receives or each advertising link impression. These types of fee approaches are vulnerable to attacks where malicious individuals inflate a company's advertising link click count or impression count. For example, malicious individuals may continually cause the company's advertisement(s) to be displayed, physically click on the company's advertisement(s), and/or write programs (often called click-bots or impression-bots) that automatically generate page views and/or clicks. These click-bots can be configured to mimic real network traffic by specifying parameters, such as clicks to page view distributions, geographic locations and network addresses, amount of traffic by days of the week and time of day, etc.

When malicious advertising activity occurs, a company may be charged for clicks or impressions that do not correspond to actual (or real) users. This can result in inaccurate fees being charged for advertising services. In those situations where web publishers are paid a fee each time a displayed advertising link is clicked or displayed, the web publishers themselves may use bots or malicious individuals to increase their revenue from the on-line advertising systems.

SUMMARY OF THE INVENTION

In accordance with one implementation consistent with the principles of the invention, a device may include logic to provide a group of advertising links; logic to obtain a first group of information when the group of advertising links is provided; logic to obtain a second group of information when an advertising link in the group of advertising links is selected; and logic to detect illegitimate activity based on the first group of information and the second group of information.

In another implementation consistent with the principles of the invention, a method may include obtaining a first group of information when an advertising link is requested, obtaining a second group of information when the advertising link is selected, and detecting illegitimate advertising-related activity based on the first group of information and the second group of information.

In yet another implementation consistent with the principles of the invention, a method may include collecting a group of information over a period of time, where the group of information is collected when at least one of an advertising link is requested or an advertising link is selected; generating a distribution based on the collected group of information; comparing the generated distribution to a stored distribution that reflects normal activity; and determining that illegitimate advertising-related activity occurred in the period of time when the generated distribution differs substantially from the stored distribution.

In still another implementation consistent with the principles of the invention, a method may include receiving a request for an advertising link; collecting a first group of information in response to the request, where the first group of information includes at least two of browser information, information relating to a device to which the advertising link is provided, or information relating to a user associated with the device; determining that the advertising link has been selected; obtaining a second group of information in response to the determining, where the second group of information includes the at least two of browser information, information relating to the device to which the advertising link is provided, or information relating to the user associated with the device; comparing the second group of information to the first group of information; and determining a presence of illegitimate activity when the second group of information does not match the first group of information.

BRIEF DESCRIPTION OF THE DRAWINGS

The accompanying drawings, which are incorporated in and constitute a part of this specification, illustrate an implementation of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention.

OVERVIEW

Implementations consistent with the principles of the invention detect illegitimate advertising activity. In this way, advertising-related charges can be more accurately determined.

When a user accesses a document for which advertising links are provided, an advertisement query request may be generated. As the name suggests, an advertisement query request requests that certain advertising links be retrieved for display with the accessed document. For example, if a user accesses a document relating to flowers, an advertising query request may be generated to retrieve advertising links that relate to the content of the document (i.e., flowers).

If the user then selects one of the retrieved advertising links (e.g., by clicking on an advertising link), a document corresponding to the advertisement may be retrieved and presented to the user. In addition, an advertisement click request may be generated. The advertisement click request may report that an advertising link that was previously retrieved by an advertisement query request was selected by the user.

In an exemplary implementation consistent with the principles of the invention, information may be obtained in connection with the advertisement query request and advertisement click request. For example, browser information, client information, and/or user information may be collected with both the advertisement query request and the advertisement click request. The information collected with the advertisement query request may be compared to the information collected with the advertisement click request. If the information collected with the advertisement query request matches the information collected with the advertisement click request, this may indicate that the advertising activity is legitimate (i.e., that the advertising link may have been selected by a legitimate user). Alternatively, if the information collected with the advertisement query request does not match the information collected with the advertisement click request, this may indicate that the advertising activity is illegitimate (e.g., the selection of the advertising link may have been performed by a click-bot). In this way, illegitimate advertising link selections may be detected.

A "document," as the term is used herein, is to be broadly interpreted to include any machine-readable and machine-storable work product. A document may include, for example, an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Exemplary Network

Figure 1:
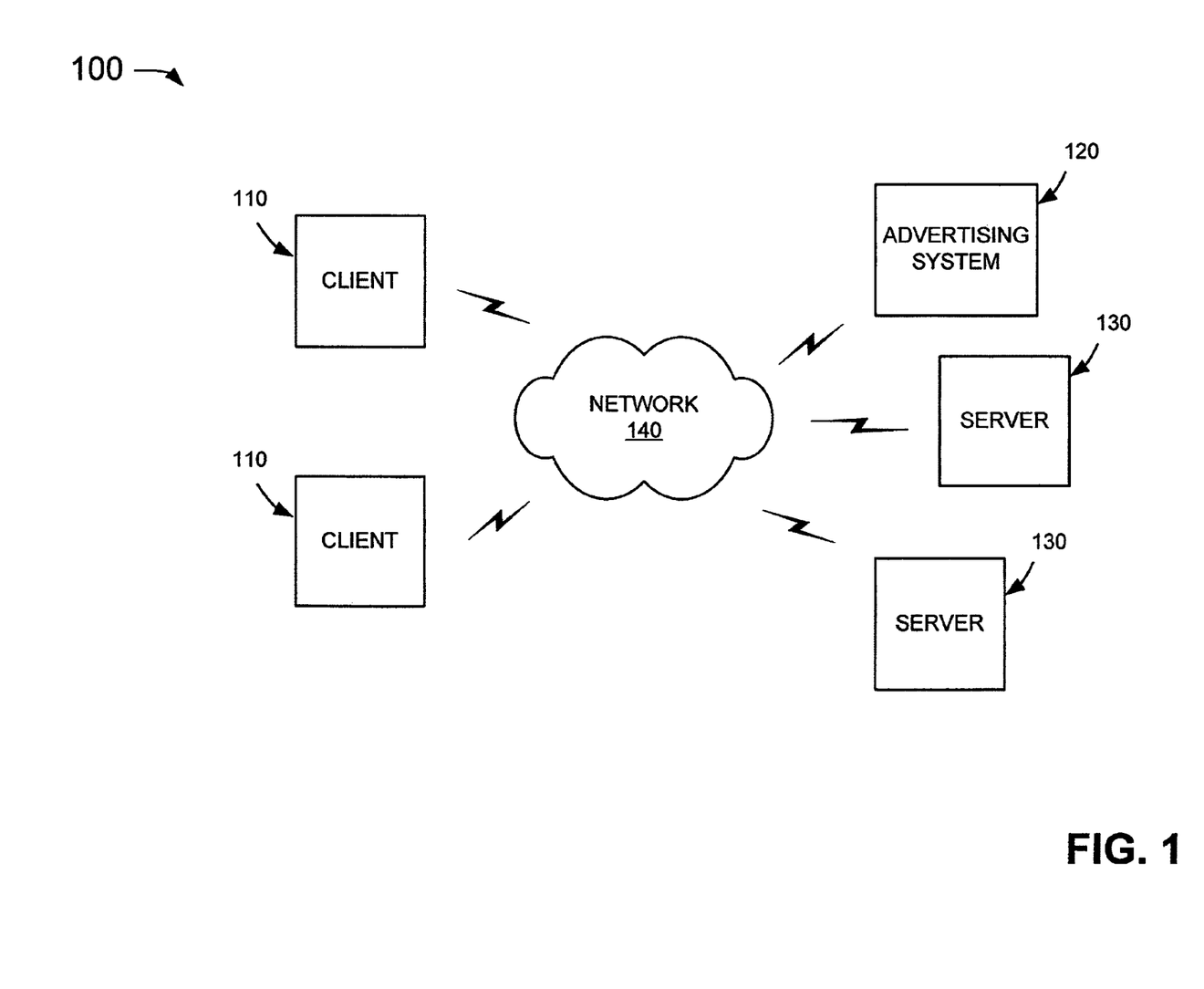
FIG. 1 is an exemplary diagram of a network in which systems and methods consistent with the principles of the invention may be implemented.

FIG. 1 is an exemplary diagram of a network 100 in which systems and methods consistent with the principles of the invention may be implemented. Network 100 may include multiple clients 110, an advertising system 120, and servers 130 connected via a network 140. Network 140 may include a local area network (LAN), a wide area network (WAN), a telephone network, such as the Public Switched Telephone Network (PSTN), an intranet, the Internet, or a combination of similar or dissimilar networks. Two clients 110, one advertising system 120, and two servers 130 have been illustrated as connected to network 140 in FIG. 1 for simplicity. In practice, there may be more or fewer clients 110, advertising systems 120, and/or servers 130. Also, in some instances, a client 110 may perform one or more of the functions of advertising system 120 and/or server 130 and vice versa.

Clients 110 may include client entities. An entity may be defined as a device, such as a personal computer, a wireless telephone, a personal digital assistant (PDA), a lap top, or another type of computation or communication device, a thread or process running on one of these devices, and/or an object executable by one of these devices. Advertising system 120 may include a server entity that maintains and provides advertising links. Servers 130 may include server entities that gather, process, search, and/or maintain documents in a manner consistent with the principles of the invention. Clients 110, advertising system 120, and servers 130 may connect to network 140 via wired, wireless, and/or optical connections.

In an implementation consistent with the principles of the invention, servers 130 may optionally include a search engine (not shown) usable by clients 110. Servers 130 may crawl documents (e.g., web pages) and store information associated with these documents in a repository of crawled documents. While advertising system 120 and servers 130 are shown as separate entities, it may be possible for one or more of servers 130 to perform one or more of the functions of advertising system 120, and vice versa. For example, it may be possible to implement advertising system 120 and one or more of servers 130 as a single server. It may also be possible to implement advertising system 120 as multiple, possibly distributed, entities.

Exemplary Advertising System Configuration

Figure 2:
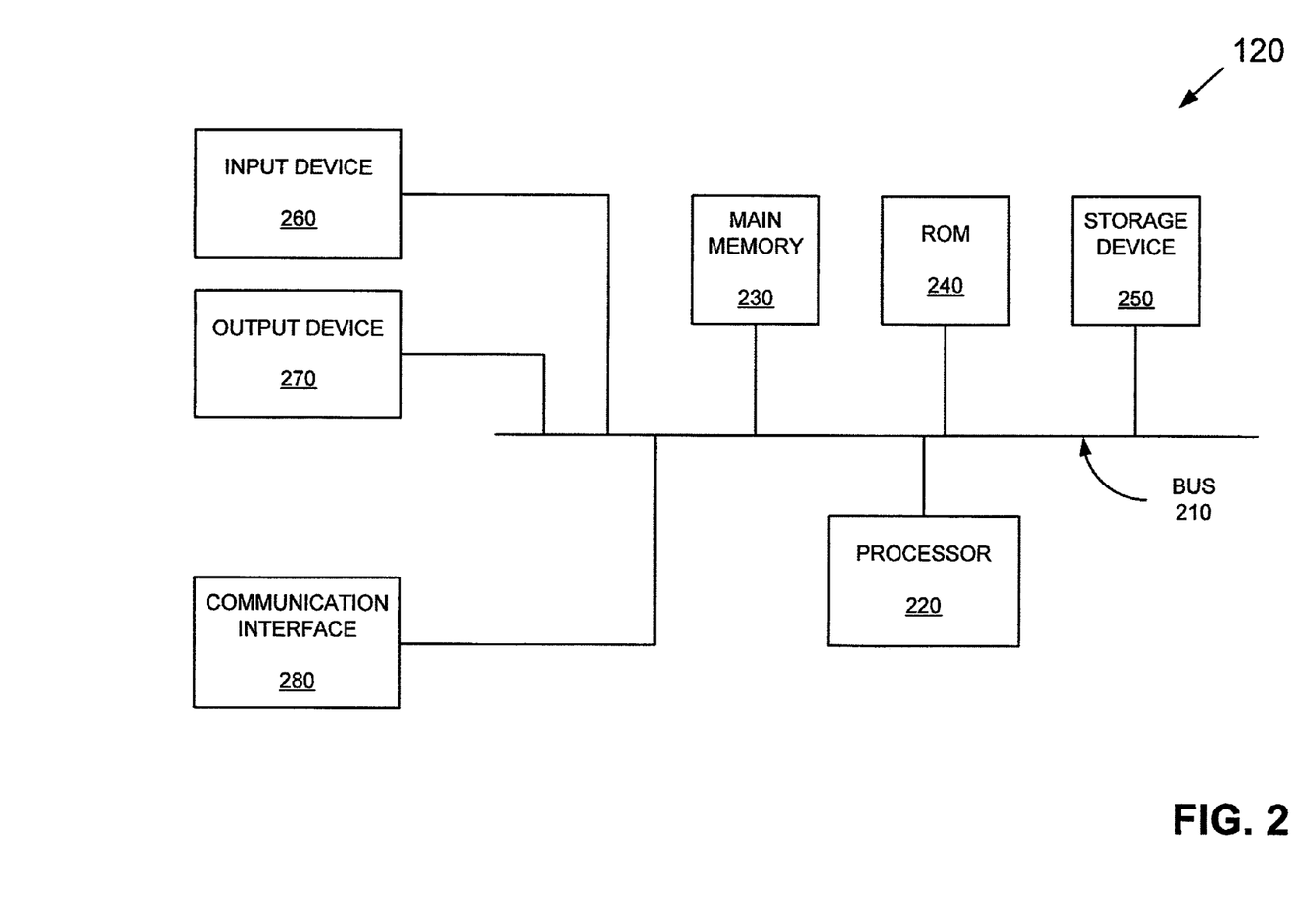
FIG. 2 is an exemplary diagram of the advertising system of FIG. 1 in an implementation consistent with the principles of the invention.

FIG. 2 is an exemplary diagram of advertising system 120 in an implementation consistent with the principles of the invention. Clients 110 and servers 130 may be similarly configured. Advertising system 120 may include a bus 210, a processor 220, a main memory 230, a read only memory (ROM) 240, a storage device 250, an input device 260, an output device 270, and a communication interface 280. Bus 210 may include a path that permits communication among the components of advertising system 120.

Processor 220 may include any type of conventional processor, microprocessor, or processing logic that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device 260 may include a conventional mechanism that permits an operator to input information to advertising system 120, such as a keyboard, a mouse, a pen, a biometric mechanism, such as a voice recognition device, etc. Output device 270 may include a conventional mechanism that outputs information to the operator, including a display, a printer, a speaker, etc. Communication interface 280 may include any transceiver-like mechanism that enables advertising system 120 to communicate with other devices and/or systems. For example, communication interface 280 may include mechanisms for communicating with another device or system via a network, such as network 140.

As will be described in detail below, advertising system 120, consistent with the principles of the invention, may detect illegitimate advertising activity. Advertising system 120 may perform this and other operations in response to processor 220 executing software instructions contained in a computer-readable medium, such as memory 230. A computer-readable medium may be defined as a physical or logical memory device and/or carrier wave. The software instructions may be read into memory 230 from another computer-readable medium, such as data storage device 250, or from another device via communication interface 280. The software instructions contained in memory 230 may cause processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing

Figure 3:
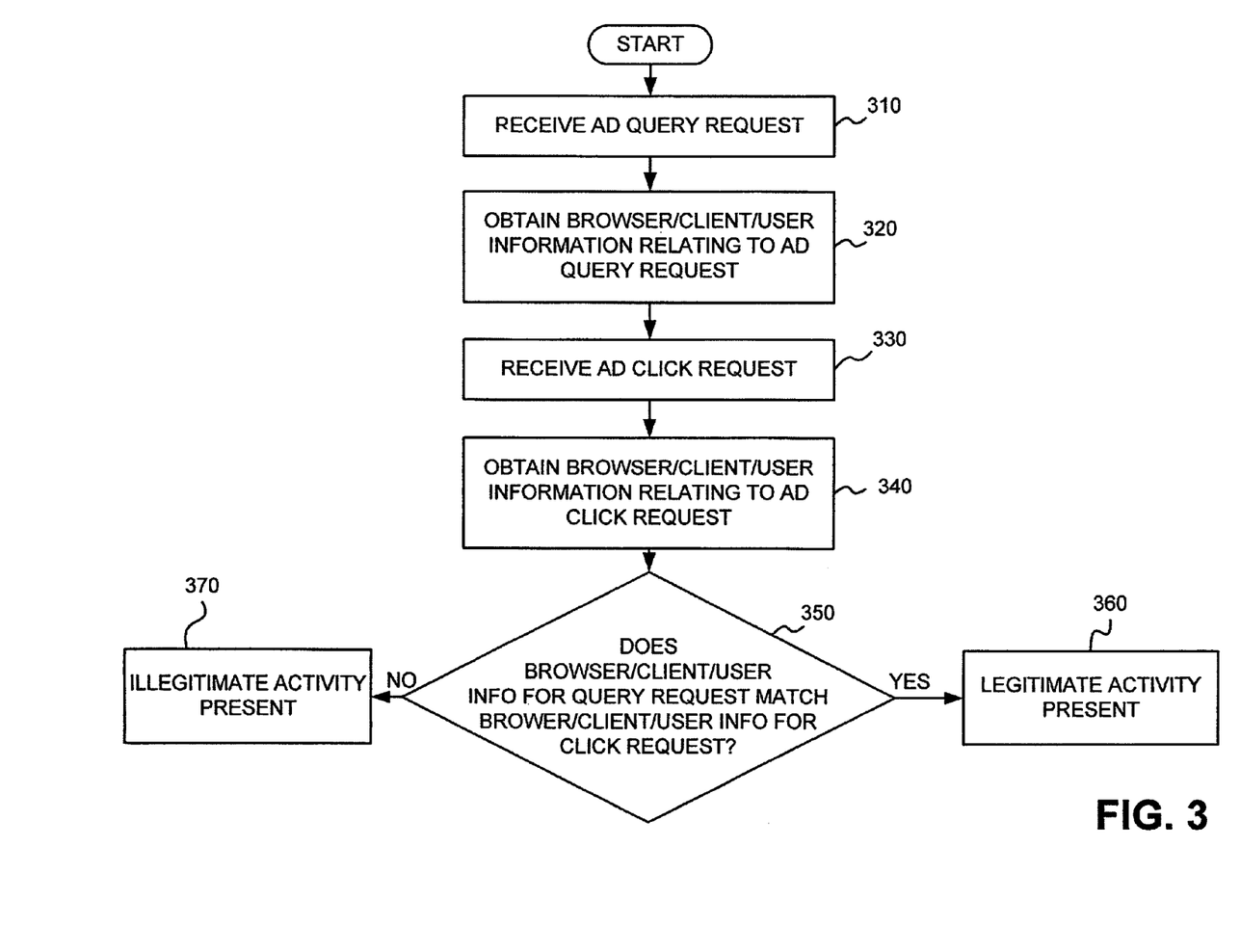
FIG. 3 is a flow chart of an exemplary process for detecting illegitimate advertising click activity in an implementation consistent with the principles of the invention.

FIG. 3 is a flow chart of an exemplary process for detecting illegitimate advertising click activity in an implementation consistent with the principles of the invention. Processing may begin by receiving an advertisement query request (act 310). In one implementation, the advertisement query request may be generated in response to a user accessing a document, such as a web page, with which advertising links are associated. For example, if a user accesses a document that provides advertising links, an advertisement query request may be generated when the user requests access to the document. In one implementation, the advertisement query request may be automatically generated via the browser used by client 110. The browser may execute a piece of code, which may cause the advertisement query request to be generated in response to client 110's request for the document. Each advertising link that is returned in response to the advertisement query request may be associated with an identifier that uniquely identifies the advertising link for this particular transaction (i.e., for this particular user's request for the document and the provisioning of the document and associated advertising links).

The advertisement query request may include information for identifying which advertising links to retrieve for the accessed document. In one implementation, the advertisement query request may include information that causes advertising links that relate to the content of the document accessed by the user to be retrieved. In this situation, the advertising links may relate to the content of the document. For example, if a user of client 110 accesses a document relating to flowers, advertising links relating to buying flowers over the Internet may be provided. The selection of appropriate advertising links to provide may, for example, be determined by identifying a keyword that represents the content of the document and using the keyword to select the appropriate advertising links. One technique for providing an advertising link based, at least in part, on the content of a document (or web page) is described in U.S. patent application Ser. No. 10/375,900, entitled "Serving Advertisements Based on Content," and filed Feb. 26, 2003, the entire contents of which are expressly incorporated herein by reference.

Information associated with the advertisement query request may be obtained (act 320). For example, in an implementation consistent with the principles of the invention, the information may include browser information, client information, and/or user information. In one implementation, the browser information may include information relating to the browser used by a client 110 to access the document. The browser information may include, for example, the type of browser being used, the version of the browser being used, information identifying whether java is enabled for the particular browser, information relating to the plugins installed on the browser (e.g., the number of plugins that have been installed, the type of plugins, the plugins' versions, etc.), the browser's history length, the number of Multipurpose Internet Mail Extensions (MIMEs) associated with the browser, the browser's window width and height, the language associated with the browser, the browser's javascript version, the header order of messages sent by the browser (i.e., the order in which the browser sends various Hyper Text Transfer Protocol (HTTP) information), and/or other type of browser information. The client information may include information relating to the particular client 110 used by the user to access the document. The client information may include, for example, an Internet Protocol (IP) address associated with client 110, the screen size of client 110, screen width, screen depth, color resolution, a clock time associated with client 110, a time zone in which client 110 is located, a type of operating system running on client 110, and/or other type of client information. The user information may include information relating to the user that uses client 110 to access the document. The user information may include, for example, cookie information and/or other user information.

The information relating to the advertisement query request may be obtained in various ways. For example, in one implementation consistent with the principles of the invention, the information may be obtained via the browser used by client 110. The browser may execute a piece of code, which may cause a predetermined combination of the above browser/client/user information to be collected. The information that is collected may include a number of different browser information items, a number of different client information items, and/or a number of different user information items. Some of the information may also be collected as part of client 110's standard request for the document. For example, an IP address may be collected, as well as browser information and HTTP header information. It will be appreciated that other techniques can be used for collecting browser information, client information, and/or user information.

An advertisement click request may be received in those situations when the user selects one of the advertising links retrieved in response to accessing the document (act 330). In one implementation, the advertisement click request may be automatically generated via the browser used by client 110. The browser may execute a piece of code, which may cause the advertisement click request to be generated in response to the user's selection of an advertising link in the document. The advertisement click request may include information identifying the selected advertising link. For example, the advertisement click request may include the unique identifier that is associated with the selected advertising link.

Information associated with the advertisement click request may be obtained (act 340). For example, in an implementation consistent with the principles of the invention, the information may include browser information, client information, and/or user information (denoted as "browser/client/user information" hereinafter). In one implementation, the browser/client/user information may include the same combination of browser/client/user information that was obtained in connection with the advertisement query request.

As set forth above, the browser information may include information relating to the browser used by a client 110 to access the document. The browser information may include, for example, the type of browser being used, the version of the browser being used, information identifying whether java is enabled for the particular browser, information relating to the plugins installed on the browser (e.g., the number of plugins that have been installed, the type of plugins, the plugins' versions, etc.), the browser's history length, the number of Multipurpose Internet Mail Extensions (MIMEs) associated with the browser, the browser's window width and height, the language associated with the browser, the browser's javascript version, the header order of messages sent by the browser (i.e., the order in which the browser sends various Hyper Text Transfer Protocol (HTTP) information), and/or other type of browser information. The client information may include information relating to the particular client 110 used by the user to access the document. The client information may include, for example, an IP address associated with client 110, the screen size of client 110, screen width, screen depth, color resolution, a clock time associated with client 110, a time zone in which client 110 is located, a type of operating system running on client 110, and/or other type of client information. The user information may include information relating to the user that uses client 110 to access the document. The user information may include, for example, cookie information and/or other user information.

The information relating to the advertisement click request may be obtained in various ways. For example, in one implementation consistent with the principles of the invention, the information may be obtained via the browser used by client 110. The browser may execute a piece of code, which may cause a predetermined combination of the above browser/client/user information to be collected. The information that is collected may include the same type of information that is collected in connection with the advertisement query request. Some of the information may also be collected as part of client 110's standard request for a document corresponding to the selected advertising link. For example, an IP address may be collected, as well as browser information and HTTP header information. It will be appreciated that other techniques can be used for collecting browser information, client information, and/or user information.

Some or all of the information obtained in connection with the advertisement query request may be compared to the information obtained in connection with the advertisement click request (act 350). For example, if, in connection with the advertisement query request, the type of plugins installed in the browser is obtained, along with an IP address for the user, then this browser and user information may be compared to the type of plugins installed in the browser and the IP address that is obtained at the time that the user clicks on (or selects) an advertising link. In some implementations, the browser/client/user information for the advertisement query request and the browser/client/user information for the advertisement click request may be stored and compared at some later point in time. In such an event, the appropriate browser/client/user information for the advertisement query request and the browser/client/user information for the advertisement click request may be identified based on the unique identifier associated with the advertising link that was selected.

If the information obtained in connection with the advertisement query request matches the information obtained in connection with the advertisement click request, then it may be determined that legitimate activity is present (act 360). That is, a click-bot was likely not used to select advertising links. Other processing may be performed in this situation to verify that the activity is actually legitimate.

If, on the other hand, the information obtained in connection with the advertisement query request does not match the information obtained in connection with the advertisement click request, then it may be determined that illegitimate activity is present (act 370). That is, a click-bot was likely used to select the advertising link. In this event, remedial measures may be taken. For example, a fee paid to a web publisher that provides the advertising links may be reduced and/or a charge to a company associated with the advertising link may be reduced.

Figure 4:
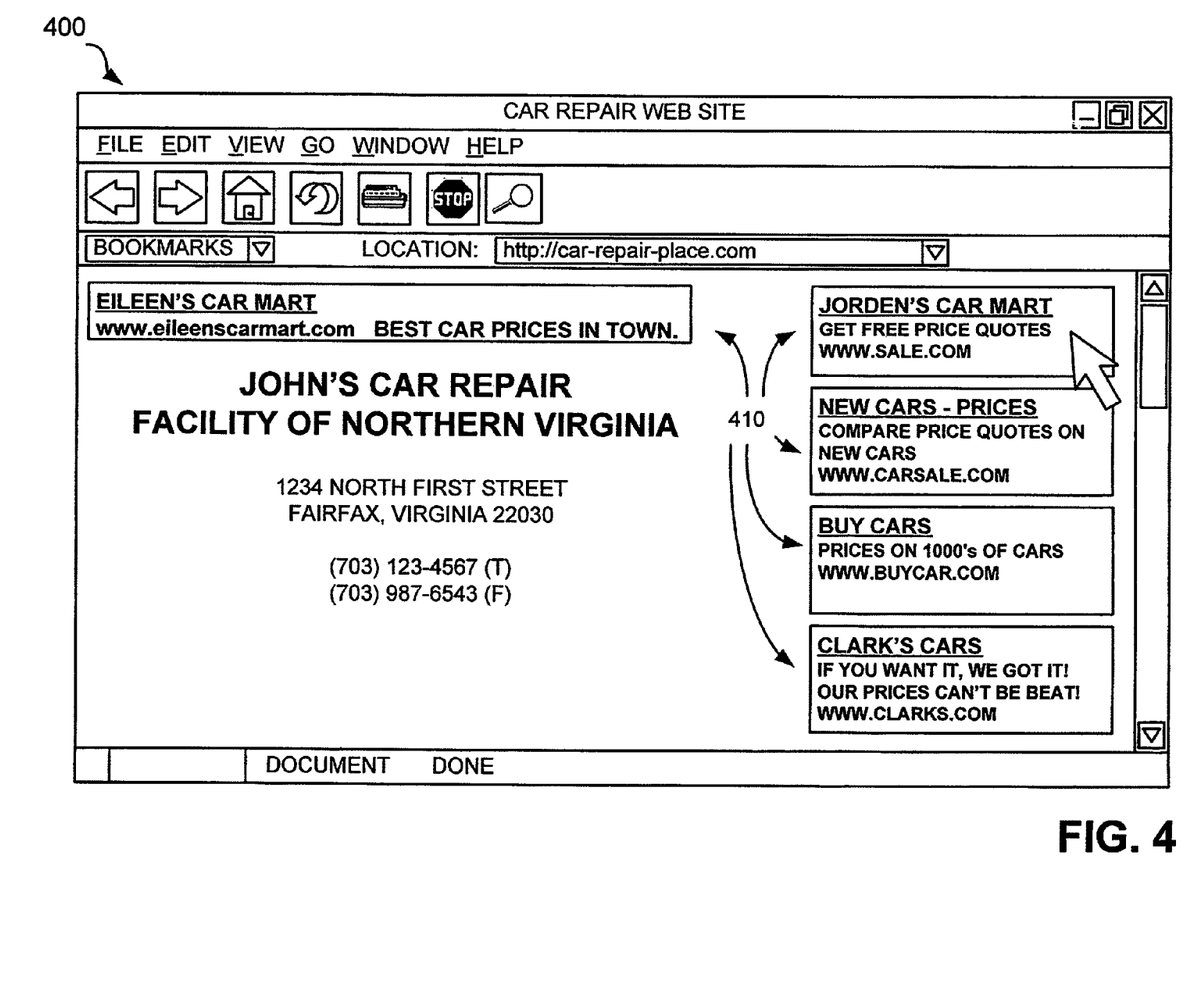
FIG. 4 is an exemplary document in an implementation consistent with the principles of the invention.

The following example illustrates the above processing. FIG. 4 is an exemplary document 400 in an implementation consistent with the principles of the invention. Document 400 may be accessed, for example, by typing in the uniform resource locator (URL) "car-repair-place.com" or in response to a search query. In the example illustrated in FIG. 4, the content of document 400 relates to car repair.

As illustrated, document 400 may provide a number of advertising links 410. Advertising links 410 may be retrieved in response to an advertisement query request that is automatically generated when a user requests access to document 400. Advertising links 410 may be chosen based on, for example, the content of document 400 (car repair in this example), the geographical area of the user, and/or other criteria.

As set forth above, when the user requests access to document 400, an advertisement query request may be generated to retrieve advertising links 410 for document 400. In addition, a combination of browser information, client information, and/or user information may be collected. Assume, for explanatory purposes, that the following combination of information is collected—that the browser being used is Netscape, that the browser has java enabled, that the time zone in which client 110 is located is the Eastern time zone, and that the IP address is 100.100.10.10.

When an advertising link 410 is selected, an advertising click request may be generated to report the selection of the advertising link. In addition, the same type of browser information, client information, and/or user information that was collected in relation to the user requesting access to document 400 may again be collected when the user selects an advertising link 410. Assume, for this example, that the following combination of information is collected when advertising link 410 is selected—that the browser being used is Internet Explorer, that the browser does not have java enabled, that the time zone in which client 110 is located is the Western time zone, and that the IP address is 111.111.11.11.

The two sets of browser information, client information, and/or user information may be compared. If the two sets do not match, then it may be determined that illegitimate advertising activity is present. In the example above, the browser/client/user information collected when the user requested access to document 400 does not match the browser/client/user information collected when the user selected an advertising link 410. Therefore, in the example above, it would be determined that illegitimate advertising activity is present. Remedial measures may then be taken, such as reducing a fee paid to a web publisher.

While the above example depicted an extreme case where no information in the sets matched, it will be appreciated that this need not be the case for determining that illegitimate activity is present. For example, assume that the following combination of information is alternatively collected when advertising link 410 is selected—that the browser being used is Netscape, that the browser has java enabled, that the time zone in which client 110 is located is the Eastern time zone, and that the IP address is 100.111.10.10.

When the two sets of browser information, client information, and/or user information are compared, it may be determined that illegitimate advertising activity is present since the browser/client/user information collected when the user requested access to document 400 does not match the browser/client/user information collected when the user selected an advertising link 410.

As a final example, assume that that the following combination of information is alternatively collected when advertising link 410 is selected—that the browser being used is Netscape, that the browser has java enabled, that the time zone in which client 110 is located is the Eastern time zone, and that the IP address is 100.100.10.10.

When the two sets of browser information, client information, and/or user information are compared, it may be determined that legitimate advertising activity may be present since the browser/client/user information collected when the user requested access to document 400 matches the browser/client/user information collected when the user selected an advertising link 410.

While the above description focuses on comparing a combination of browser/client/user information collected when access to a document is requested to a combination of browser/client/user information collected when an advertising link in the document is selected to detect illegitimate activity, implementations consistent with the principles of the invention are not so limited. For example, in other implementations consistent with the principles of the invention, the detection of illegitimate activity may be based on a distribution of browser/client/user information.

Figure 5:
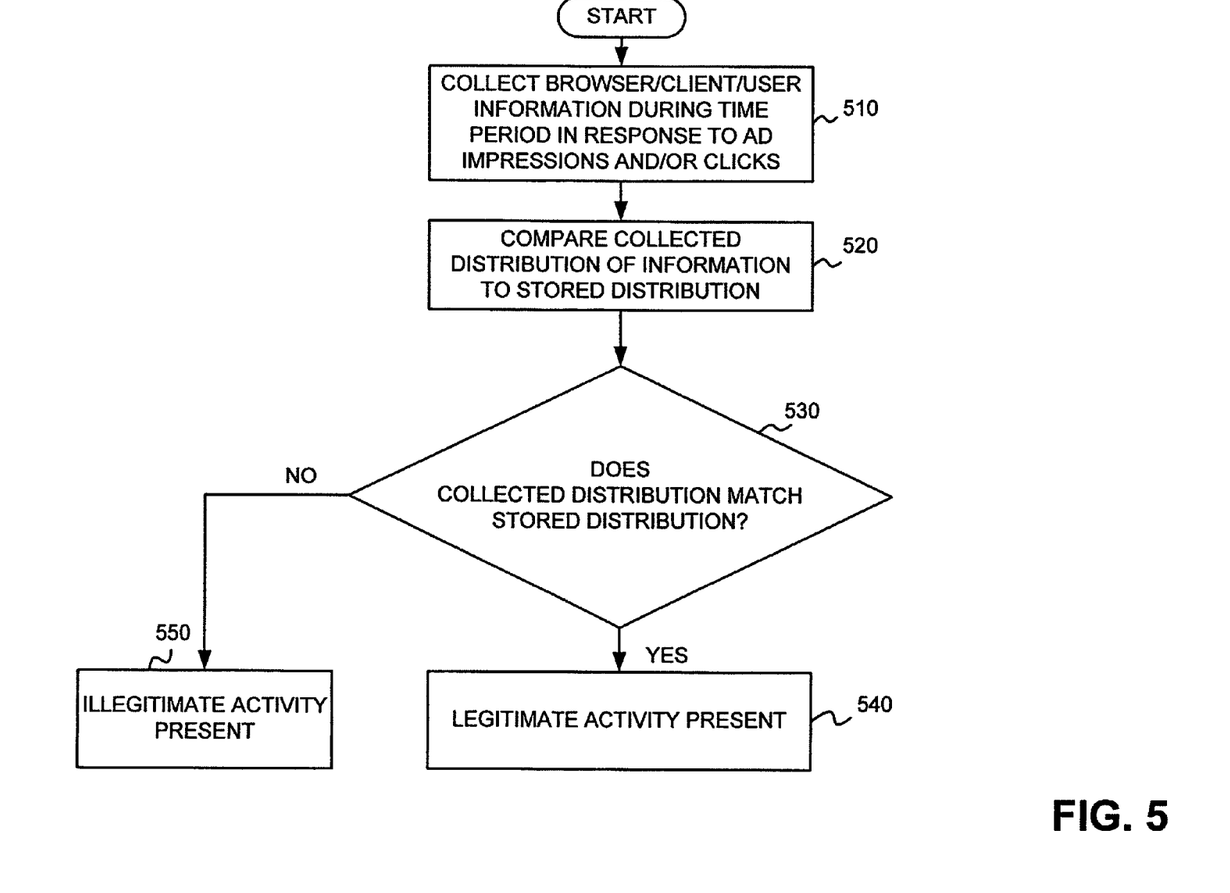
FIG. 5 is a flow chart of an exemplary process for detecting illegitimate advertising activity in another implementation consistent with the principles of the invention.

FIG. 5 is a flowchart of an exemplary process for detecting illegitimate advertising activity in another implementation consistent with the principles of the invention. Processing may begin by collecting legitimate browser/client/user information over a period of time for advertisement query requests and advertisement click requests. A distribution of legitimate browser/client/user information may be generated and stored based on the collected information. Thereafter, at predetermined intervals, browser/client/user information may be collected when access to a document is requested and/or when an advertising link in the document is selected and a distribution determined (act 510). The distribution of browser/client/user information collected during a time interval may be compared to the stored distribution of legitimate browser/client/user information (acts 520 and 530). If the obtained distribution approximately matches (e.g., within some threshold) the stored distribution (act 530), then it may be determined that legitimate activity may be present (act 540). If, on the other hand, the obtained distribution substantially differs from the stored distribution (e.g., outside some threshold), then it may be determined that illegitimate activity may be present during the time period (e.g., a click-bot or impression-bot may have been used for advertising link selections and/or impressions) (act 550). In this event, remedial measures may be taken. For example, a fee paid to a web publisher that provides the advertising links may be reduced.

CONCLUSION

Implementations consistent with the principles of the invention detect illegitimate advertising activity. In this way, advertising-related charges can be more accurately determined.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, one or more of the acts described with respect to FIG. 3 or 5 may be performed by advertising system 120 or another device (or combination of devices). In one implementation, one or more of the acts described with respect to FIG. 3 or 5 may be performed by a client 110 or a server, such as one of servers 130. For example, a browser assistant (i.e., software that operates in conjunction with a conventional web browser which is sometimes referred to as toolbar software) may perform one or more of the acts described with respect to the processing of FIG. 3 or 5.

Moreover, while series of acts have been described with regard to FIGS. 3 and 5, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, performed by a server including one or more computers on a network, comprising:
    receiving, by the server, an advertisement query request for an advertising link;
    obtaining, by the server, and in response to the advertisement query request, a first group of information related to at least one of: a browser associated with a client device, a client device to which the advertising link is to be provided, or a user to which the advertising link is to be provided, where the first group of information is obtained before the server receives an indication that the advertising link has been selected;
    receiving, by the server, the indication that the advertising link has been selected;
    obtaining, by the server, and in response to the receiving the indication, a second group of information related to at least one of: a browser associated with a client device, a client device to which the advertising link is to be provided, or a user to which the advertising link is to be provided; and
    determining a presence of illegitimate activity based on a comparison of the first group of information and the second group of information.

2. The method, performed by the server of claim 1, where the information relating to the browser associated with the client device includes:
    at least one of a browser type, a browser version, information identifying whether java is enabled for the browser, information relating to a plugin installed on the browser, a history length associated with the browser, a number of Multipurpose Internet Mail Extensions (MIMEs) associated with the browser, a window width associated with the browser, a window height associated with the browser, a language associated with the browser, a javascript version associated with the browser, or an order of a header of messages transmitted by the browser.

3. The method, performed by the server of claim 1, where the information relating to the client device includes:
at least one of an Internet Protocol (IP) address associated with the client device, a screen size associated with the client device, a screen width associated with the client device, a screen depth associated with the client device, a color resolution associated with the client device, a clock time associated with the client device, a time zone in which client device is located, or a type of operating system running on the client device.

4. The method, performed by the server of claim 1, where the information relating to the user includes cookie information.

5. The method, performed by the server of claim 1, where the first group of information and the second group of information include at least two of:
browser information associated with a client device, information relating to a client device to which the advertising link is to be provided, or information relating to a user associated with a client device.

6. The method, performed by the server of claim 1, where the determining includes:
comparing the first group of information to the second group of information.

7. The method, performed by the server of claim 6, where the comparing further comprises:
determining that illegitimate activity is present when the second group of information does not match the first group of information.

8. The method, performed by the server of claim 1 further comprising:
providing the advertising link in response to receiving the request, the advertising link being provided in association with a document.

9. The method, performed by the server of claim 8, where the advertising link is provided based on a keyword.

10. The method, performed by the server of claim 9, where the document is identified based on the keyword.

11. The method, performed by the server of claim 8, where the advertising link relates to a content of the document.

12. A system comprising:
a server, including one or more computers on a network, comprising:
means for receiving an advertisement query request for an advertising link;
means for obtaining, in response to the advertisement query request, a first group of information associated with at least one of: a browser associated with a client device, a client device to which the advertising link is to be provided, where the first group of information is obtained before the server receives an indication that the advertising link has been selected; or a user to which the advertising link is to be provided;
means for determining that the advertising link has been selected;
means for obtaining, in response to determining that the advertising link has been selected, a second group of information associated with at least one of: a browser associated with a client device, a client device to which the advertising link is to be provided, or a user to which the advertising link is to be provided; and
means for analyzing the first group of information and the second group of information to determine whether selection of the advertising link is legitimate.

13. The system of claim 12, where the illegitimate activity includes use of a program to automatically select advertising links.

14. A server, including one or more computers on a network, the server comprising:
a processor;
a memory to store instructions that when executed by the processor, cause the processor to:
provide a group of advertising links to a client device;
obtain, from the client device, and when the group of advertising links is provided, a first group of information related to at least one of: a browser associated with a client device, a client device to which the advertising link is to be provided, or a user to which the advertising link is to be provided, where the first group of information is obtained before the server receives an indication that at least one of the group of advertising links is selected;
obtain, from the client device, and when the group of advertising links is selected, a second group of information related to at least one of: a browser associated with a client device, a client device to which the advertising link is to be provided, or a user to which the advertising link is to be provided; and
detect illegitimate activity based on the first group of information and the second group of information.

15. The server of claim 14, where the processor is further to:
adjust an amount charged to an advertiser associated with the advertising link when illegitimate activity is determined to be present.

16. A memory device, in a server including one or more computers on a network, the memory device containing instructions for controlling a processor to:
provide a group of advertising links to be requested by the server;
obtain, from a client device, and when the group of advertising links is selected, a first group of information related to at least one of: a browser associated with a client device, a client device to which the advertising link is to be selected, or a user to which the advertising link is to be provided, where the first group of information is obtained before the processor receives an indication that at least one of the group of advertising links is selected;
obtain, from the client device, and when the group of advertising links is selected, a second group of information related to at least one of: a browser associated with a client device, a client device to which the advertising link is to be provided, or a user to which the advertising link is to be provided; and
detect illegitimate activity based on the first group of information and the second group of information.

17. The memory device of claim 16, where the first group of information and the second group of information include a same type of information.

18. A method, performed by a server including one or more computers on a network, comprising:
requesting, by a processor associated with the server, an advertising link;
obtaining, from a processor associated with the server, and when the advertising link is requested, a first group of information associated with at least one of: a browser associated with one or more client devices, one or more client devices to which the advertising link is to be provided, or a user associated with one or more client devices, where the first group of information is obtained before the server receives an indication that the advertising link is selected;

obtaining, from a processor associated with the server, and when the advertising link is selected, a second group of information associated with at least one of: a browser associated with one or more client devices, one or more client devices to which the advertising link is to be provided, or a user associated with one or more client devices; and determining whether the advertising-related activity is legitimate or illegitimate, based on the first group of information and the second group of information.

19. The method, performed by a server of claim 18, where the determining includes:

comparing the first group of information to the second group of information.

20. The method, performed by the server of claim 19, where the comparing further includes:

determining that illegitimate advertising-related activity is present when the first group of information does not match the second group of information.

21. The method, performed by the server of claim 18, where the first group of information and the second group of information include the browser information associated with the one or more client devices, the browser information including:

at least one of a browser type, a browser version, information identifying whether java is enabled for the browser, information relating to a plugin installed on the browser, a history length associated with the browser, a number of Multipurpose Internet Mail Extensions (MIMEs) associated with the browser, a window width associated with the browser, a window height associated with the browser, a language associated with the browser, a javascript version associated with the browser, or an order of a header of messages transmitted by the browser.

22. The method performed by the server of claim 18, where the first group of information and the second group of information include information relating to the one or more client devices to which the advertising link is provided, the information relating to the one or more client devices including:

at least one of an Internet Protocol (IP) address associated with the one or more client devices, a screen size associated with the one or more client devices, a screen width associated with the one or more client devices, a screen depth associated with the one or more client devices, a color resolution associated with the one or more client devices, a clock time associated with the one or more client devices, a time zone in which the one or more client devices is located, or a type of operating system running on the one or more client devices.

23. The method performed by the server of claim 18, where the first group of information and the second group of information include cookie information relating to the user.

24. The method of claim 18, where the illegitimate advertising-related activity includes use of a program to automatically select advertising links.

25. A server, including one or more computers on a network, comprising:

a memory to store an advertising link; and a processor to:

receive, from a client device, an advertisement query request for an advertising link;

obtain first information, from the client device, when the advertising link is requested, the first information including at least one of: browser information associated with the client device, information relating to the client device to which the advertising link is provided, or information relating to a user associated with a client device, where the first group of information is obtained before the processor receives an indication that the advertising link is selected;

obtain second information, from the client device when the advertising link is selected, the second information including at least one of: browser information associated with the client device, information relating to the client device to which the advertising link is provided, or information relating to a user associated with a client device;

detect illegitimate advertising-related activity based on the first information and the second information.

26. The device of claim 25, where the first information and the second information include at least two of:

browser information associated with the client device, information relating to the client device to which the advertising link is provided, or information relating to a user associated with the client device.

27. A memory device, in a server including one or more computers on a network, the memory device containing instructions for controlling a processor to:

receive, from a client device, an advertisement query request for an advertising link;

receive first information, from the client device, when the advertising link is provided, the first information including at least one of: browser information associated with the client device, information relating to the client device to which the advertising link is provided, or information relating to a user associated with the client device, where the first group of information is received before the server receives an indication that the advertising link is selected;

receive second information, from the client device, when the advertising link is selected, the first information including at least one of: browser information associated with the client device, information relating to the client device to which the advertising link is provided, or information relating to a user associated with the client device; and use the first information and second information to determine whether selection of the advertising link is associated with illegitimate advertising-related activity.

28. The memory device of claim 27, further comprising instructions to cause the processor to:

adjust an amount charged to an advertiser associated with the advertising link when illegitimate advertising-related activity is determined to be present.

29. A method, performed by a server including one or more computers on a network, the method comprising:

collecting, by one or more computers associated with the server, and over a period of time, first information related to legitimate advertising activity, the first information including at least one of: browser information associated with a client device, information relating to a client device to which the advertising link is provided, or information relating to a user associated with a client device;

generating a first distribution of legitimate information based on the first information related to legitimate advertising activity;

collecting second information, during a predetermined time interval, related to at least one of an advertising link being requested by a client device or an advertising link being selected by the client device, the second information including at least one of: browser information associated with a client device, information relating to a client device to which the advertising link is provided, or information relating to a user associated with a client device;

generating a second distribution based on the second information;

comparing the generated first distribution of legitimate information to the generated distribution of second information; and determining that illegitimate advertising-related activity occurred during the predetermined time interval period, if the generated second distribution differs from the first distribution by a threshold amount.

30. The method of claim 29, where the browser information associated with the client device includes:

at least one of a browser type, a browser version, information identifying whether java is enabled for the browser, information relating to a plugin installed on the browser, a history length associated with the browser, a number of Multipurpose Internet Mail Extensions (MIMEs) associated with the browser, a window width associated with the browser, a window height associated with the browser, a language associated with the browser, a javascript version associated with the browser, or an order of a header of messages transmitted by the browser.

31. The method of claim 29, where the information relating to the client device to which the advertising link is provided includes:

at least one of an Internet Protocol (IP) address associated with the client device, a screen size associated with the client device, a screen width associated with the client device, a screen depth associated with the client device, a color resolution associated with the client device, a clock time associated with the client device, a time zone in which the client device is located, or a type of operating system running on the client device.

32. The method of claim 29, where the information relating to a user associated with the client device includes cookie information.

33. The method of claim 29, where the information includes at least two of:

browser information associated with the client device, information relating to the client device to which the advertising link is provided, or information relating to a user associated with the client device.

34. A method, performed by a server, including one or more computers on a network, comprising:

receiving, by a processor associated with the server, an advertisement query request for an advertising link;

collecting a first group of information, by a processor associated with the server, in response to the request, the first group of information including at least two of:

browser information associated with one or more client devices, information relating to one or more client devices to which the advertising link is provided, or information relating to a user associated with one or more client devices, where the first group of information is obtained before the server receives an indication advertising link has been selected, and;

determining that the advertising link has been selected;

obtaining a second group of information, from the one or more client devices, in response to the determining, the second group of information including at least two of:

browser information associated with the one or more client devices, information relating to one or more clients to which the advertising link is provided, or information relating to a user associated with one or more client devices;

comparing the second group of information to the first group of information; and determining a presence of illegitimate activity when the second group of information does not match the first group of information.

35. The method, performed by the server of claim 34 further comprising:

adjusting an amount charged to an advertiser associated with the advertising link when illegitimate advertising-related activity is determined to be present.

* * * * *

UNITED STATES PATENT AND TRADEMARK OFFICE
CERTIFICATE OF CORRECTION

PATENT NO.        : 7,712,141 B1                              Page 1 of 1
APPLICATION NO. : 11/170134
DATED             : May 4, 2010
INVENTOR(S)       : Shrish Agrawal et al.

It is certified that error appears in the above-identified patent and that said Letters Patent is hereby corrected as shown below:

Column 11, line 53, after "provided,", insert --or a user to which the advertising link is to be provided,--.

Column 11, lines 55 and 56, after "selected;", delete "or a user to which the advertising link is to be provided;".

Column 12, line 42, after "link is to be", delete "selected" and insert --provided--.

Column 14, line 53, after "collecting,", delete "by one or more comuters associated with the".

Column 14, line 54, delete "server, and".

Signed and Sealed this

Thirteenth Day of July, 2010

David J. Kappos
*Director of the United States Patent and Trademark Office*